United States Patent [19]

Baba

[11] Patent Number: 5,167,427
[45] Date of Patent: Dec. 1, 1992

[54] AIR BAG DEVICE HAVING ENGAGEMENT PORTIONS TO FACILITATE ATTACHMENT OF THE COVER TO THE RETAINER

[75] Inventor: Yoshiyuki Baba, Shiga, Japan

[73] Assignee: Takata Corporation, Tokyo, Japan

[21] Appl. No.: 688,455

[22] Filed: Apr. 22, 1991

[30] Foreign Application Priority Data

May 24, 1990 [JP] Japan .................. 2-134687

[51] Int. Cl.$^5$ ............................. B60R 21/20
[52] U.S. Cl. .................. 280/743; 280/728; 403/363
[58] Field of Search ............ 280/728, 743, 731, 741; 403/345, 363

[56] References Cited

U.S. PATENT DOCUMENTS

| | | |
|---|---|---|
| 3,532,360 | 10/1970 | Leising et al. |
| 3,588,142 | 6/1971 | Gorman |
| 4,877,264 | 10/1989 | Cuevas |
| 5,074,584 | 12/1991 | Jarboe .................. 280/743 |

FOREIGN PATENT DOCUMENTS

| | | |
|---|---|---|
| 3545028 | 7/1987 | Fed. Rep. of Germany |
| 3604843 | 8/1987 | Fed. Rep. of Germany |
| 8904999 | 8/1989 | Fed. Rep. of Germany |
| 109146 | 4/1989 | Japan .................. 280/743 |
| 160756 | 6/1989 | Japan .................. 280/743 |
| 133267 | 5/1990 | Japan .................. 280/728 |
| 306847 | 12/1990 | Japan .................. 280/743 |
| 1601127 | 10/1981 | United Kingdom ....... 403/345 |
| 2192841 | 1/1988 | United Kingdom ....... 280/728 |

Primary Examiner—Robert P. Olszewski
Assistant Examiner—Boris Milef
Attorney, Agent, or Firm—Kanesaka and Takeuchi

[57] ABSTRACT

An air bag device, in which an air bag is attached to a retainer to which a module cover for covering the air bag is fixed, is characterized in that the module cover is provided with an engagement portion for the retainer.

5 Claims, 7 Drawing Sheets

AIR BAG DEVICE HAVING ENGAGEMENT PORTIONS TO FACILITATE ATTACHMENT OF THE COVER TO THE RETAINER

FIELD OF THE INVENTION AND RELATED ART STATEMENT

The present invention relates to an air bag device adapted to develop an air bag at a crash or the like of a vehicle for protecting an occupant, and particularly to an improved air bag device which allows easy assembling of a module cover covering an air bag in an assembly process.

In an air bag device, a folded air bag is attached to a mounting plate called as a "retainer", and is covered with a module cover. The module cover is similarly attached to the retainer, and is provided with a tear line (weak linear portion) at which tear starts when the air bag develops.

Further, an inflator is attached directly or through an appropriate mounting member to the retainer. The inflator is adapted to discharge a gas for rapidly developing the air bag at the crash or the like of the vehicle.

Such an air bag in the prior art will be described below with reference to FIGS. 7 and 8.

In FIG. 7, a retainer 10 has a flat plate portion 14 to which an air bag 12 is attached, and a module cover mounting which is formed of an erected piece 16 projected oppositely to an occupant (i.e., oppositely to a mounting side of the air bag 12) from an edge of the flat plate portion 14. The air bag 12 is in a folded condition and is covered with a module cover 18. The module cover 18 has a leg 18a at a proximal side thereof, which is fixed to the above erected piece 16 by rivets 20. A numeral 22 indicates an inflator, which has an upper portion projected through an opening 24 formed in the flat plate portion 14 into the air bag 12, and is fixed to the retainer 10. A numeral 26 indicates an air bag mounting member called as a ring, which cooperates with an edge of the opening 24 in the flat plate portion 14 to pinch an open edge of the air bag 12, so as to fix the air bag 12 to the retainer 10. A numeral 28 indicates a tear line provided in the above module cover 18.

In the air bag device thus constructed, when the inflator 22 is activated due to the crash or the like of the vehicle, a large amount of gas is rapidly injected from the inflator 22 to start the development of the air bag 12. In accordance with the inflation of the air bag 12, the module cover 18 tears along the tear line 28, as shown in FIG. 8, and thus, the air bag 12 rapidly develops at the interior of the vehicle to protect an occupant.

In a manufacturing process of the prior art air bag device, the air bag 12 is fixed to the retainer 10, and then is folded to have a small volume so that the folded air bag 12 is laid on the retainer 10. Then, the module cover 18 is assembled from an upper side to accommodate the air bag 12. The module cover 18 is pushed into a position in which the leg 18a of the module cover 18 overlaps the erected piece 16 of the retainer 10. In this condition, a reinforcing member 21 is laid thereon and the module cover 18 is fixed thereto by the rivets 20.

As described above, in this assembling process, after the module cover 18 is put or assembled over the air bag 12, these are sent to a riveting step in which the leg 18a is fixed by the rivets 20 while maintaining the air bag 12 in the compacted condition. However, if one leaves his or her hold of the module cover 18, the module cover 18 is floated and spaced from the retainer 10 due to a resiliency of the compacted air bag 12. Therefore, in the riveting step after the putting and covering step of the module cover, an operation for pushing the module cover 18 to cover the retainer 10 is required again, which causes a problem of low operation efficiency.

Further, there are such problems that the module cover may be dislocated and/or a whole volume becomes large during transferring from the folding step of the air bag to the riveting step.

OBJECT AND SUMMARY OF THE INVENTION

It is an object of the invention to provide an air bag device allowing an extremely easy assembling.

It is another object of the invention to provide an air bag device having a high coupling strength between a module cover and a retainer.

An air bag device of the invention, in which an air bag is attached to a retainer to which a module cover for covering the air bag is fixed, is characterized in that the module cover is provided with an engagement portion for the retainer.

In the air bag device thus constructed of the invention, when the module cover is put to cover the air bag after folding, the engagement portion of the module cover engages with the retainer, so that the module cover will not be dislocated from the retainer even if one releases his or her hold of the module cover.

DESCRIPTION OF THE PREFERRED EMBODIMENTS

Embodiments will be described below with reference to the drawings.

Figure 1:
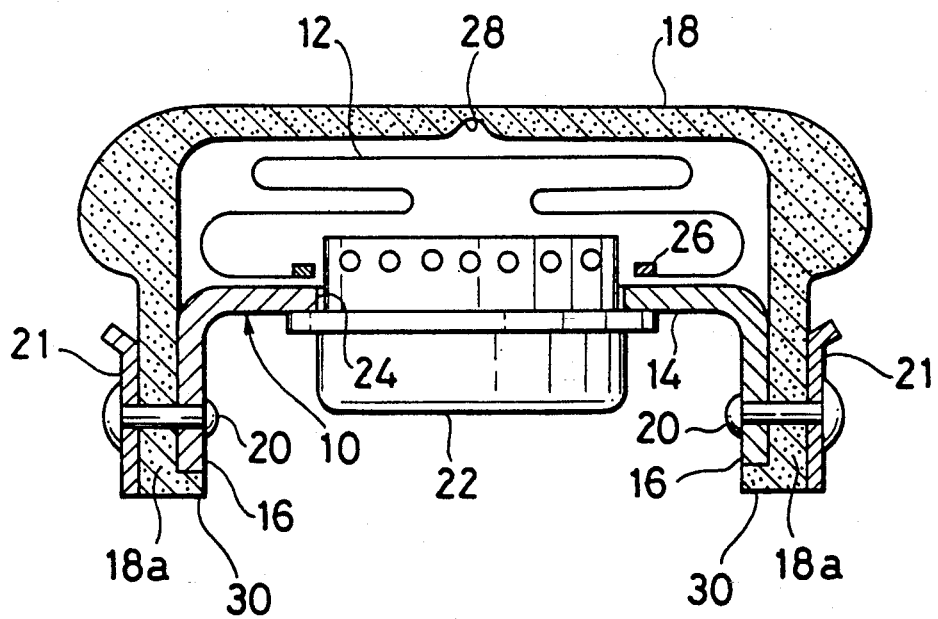
FIG. 1 is a longitudinal section illustrating an embodiment of the invention.

FIG. 1 is a longitudinal section of an air bag device according to an embodiment of the present invention, and FIGS. 2A, 2B, 2C and 2D are views for illustrating an assembling process thereof. In this embodiment, a module cover 18 has a leg 18a which is provided at its end with a hook 30 forming an engagement portion. This hook 30 protrudes toward an interior of the module cover 18, and is engageable with an end surface of an erected piece 16 of a retainer 10.

Figure 2A:
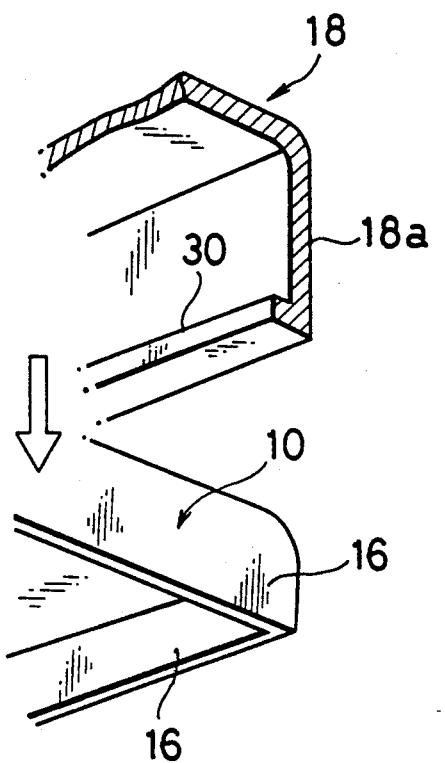
FIGS. 2A, 2B, 2C and 2D are views for illustrating an assembling process thereof.
Figure 2B:
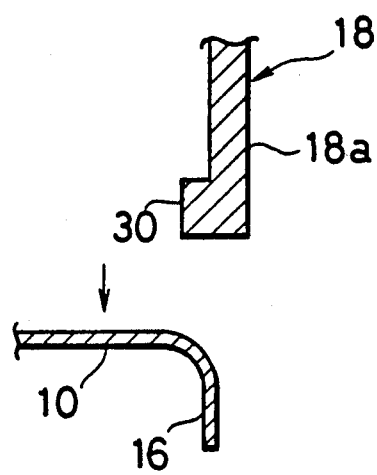
Figure 2C:
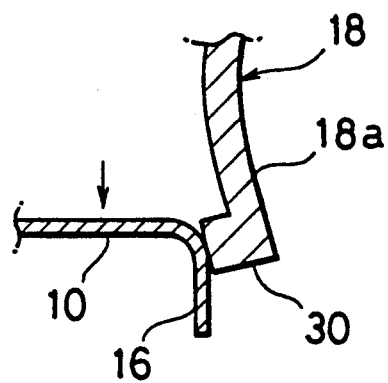
Figure 2D:
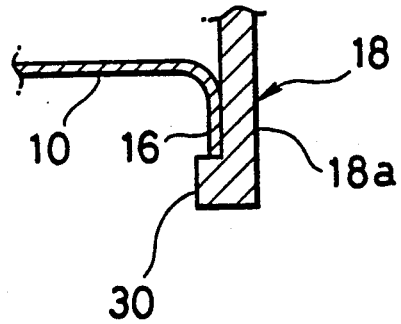

As shown in FIGS. 2A-2D, when the module cover 18 is put over the retainer 10, the leg 18a elastically deforms outward, as shown in FIG. 2C, and slides along on the erected piece 16. The hook 30 ultimately engages with the end of the erected piece 16, as shown in FIG. 2D and FIG. 1.

After the hook 30 engages with the end of the erected piece 16, the module cover 18 will not be dislocated from the retainer 10 even if the folded air bag 12 biases the module cover 18 upward. Therefore, in a folding step of the air bag 12, the module cover 18 which is put over the retainer 10 it is not dislocated from the retainer 10 even if the module cover 18 is not yet fixed by the rivets 20. Consequently, dislocation of the module cover 18 can be completely prevented during transfer thereof from the folding step of the air bag 12 to the riveting step, and further, the whole air bag device is transferred to the riveting step while maintaining compact configurations. In the riveting step, it is not necessary to push the module cover 18 again, and it can be set in a riveting apparatus for fastening the rivets 20 as it is, so that the riveting efficiency can be extremely increased.

Figure 3A:
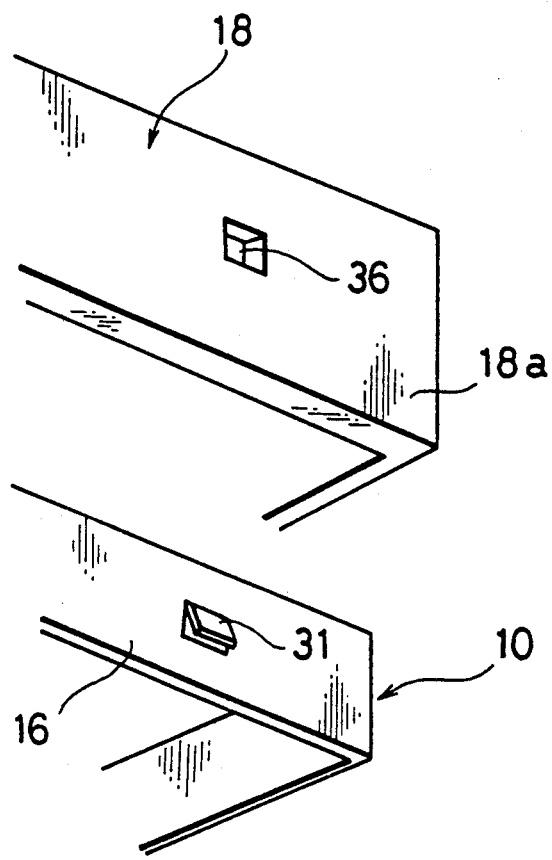
FIGS. 3A, 3B, 3C and 3D are views for illustrating an assembling process of another embodiment.
Figure 3B:
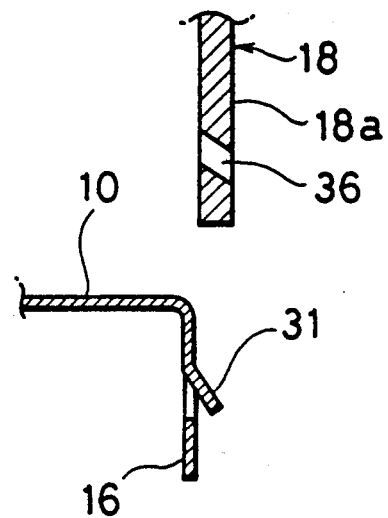
Figure 3C:
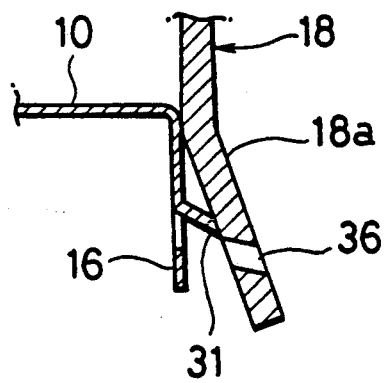
Figure 3D:
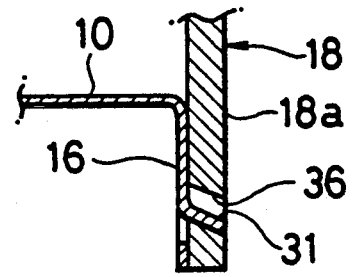
Figure 4:
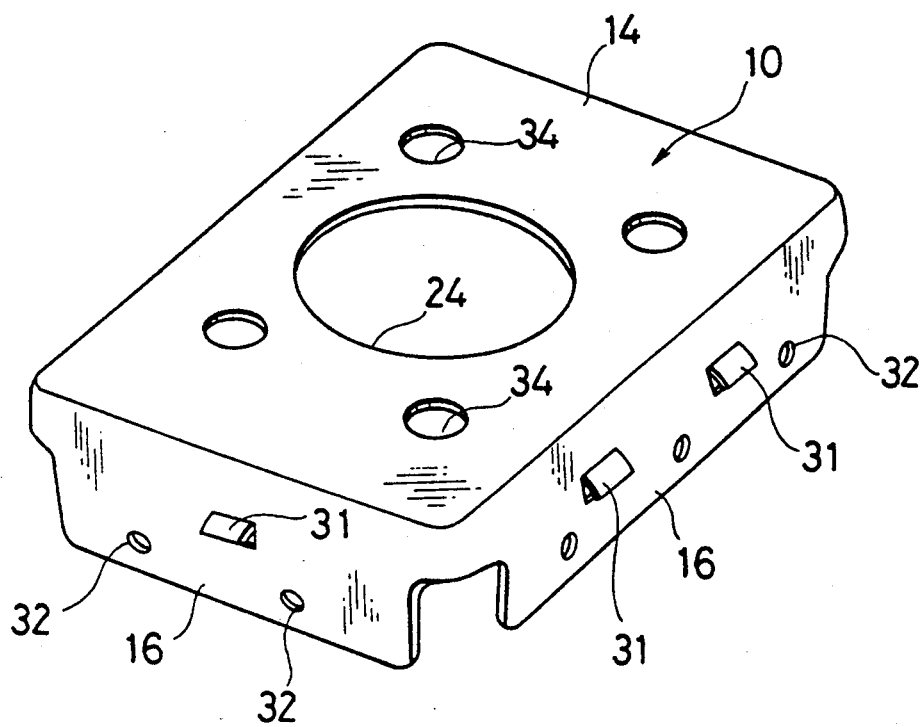
FIG. 4 is a perspective view of a retainer.

FIGS. 3A, 3B, 3C and 3D are views for illustrating an assembling process of an air bag device according to another embodiment of the invention, and FIG. 4 is a perspective view of a retainer used in this embodiment. In this embodiment, the retainer 10 is provided with partially cut and bent tongues 31. The tongues 31 have edges, which are located at a side of a flat plate portion 14 of the retainer 10 and are continuous to the retainer 10, and have free ends, which are located at a side of the erected piece 16. The module cover 18 is provided with openings 36 having sizes for receiving these tongues 31, respectively, and the openings 36 function as engagement portions. In FIG. 4, numerals 32 indicate rivet holes provided in the erected piece 16, and numerals 34 indicate rivet holes in the flat plate portion 14 for fixing an inflator 22.

Also in this embodiment, when the module cover 18 is moved to cover the retainer 10, the leg 18a elastically deforms outward along the outer surface of the erected piece 16, and ultimately, as shown in FIG. 3D, the tongues 31 move into the openings 36 to form an engaged condition. Owing to the engagement of the tongues 31 and the openings 36, the module cover 18 will not be dislocated from the retainer 10 by the resiliency applied from the air bag 12.

Figure 5:
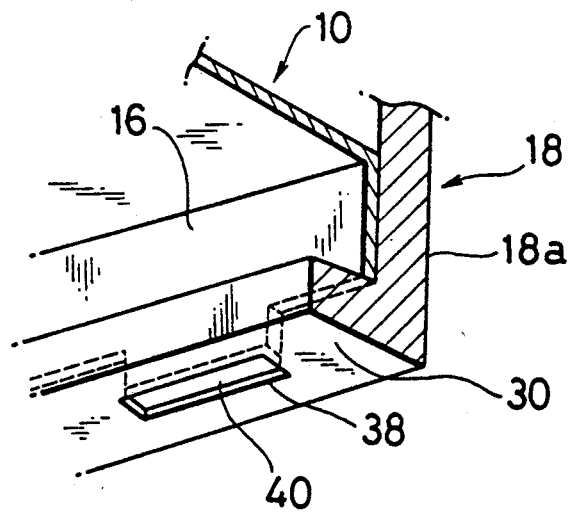
FIG. 5 is a fragmentary cross section of a still another embodiment.

FIG. 5 and FIGS. 6A, 6B, 6C and 6D are views for illustrating an assembling process of a still another embodiment of the invention. Specifically, FIG. 5 is a perspective sectional view of engaged portions of the retainer and the hook after the assembly, and FIGS. 6A, 6B, 6C and 6D are views illustrating assembling steps, respectively.

In this embodiment, the module cover 18 is provided at the end of the leg 18a with the hook 30, and this hook 30 is provided with openings 38. The retainer 10 is provided at the end of the erected piece 16 with projections 40 to be located in the openings 38.

Figure 6A:
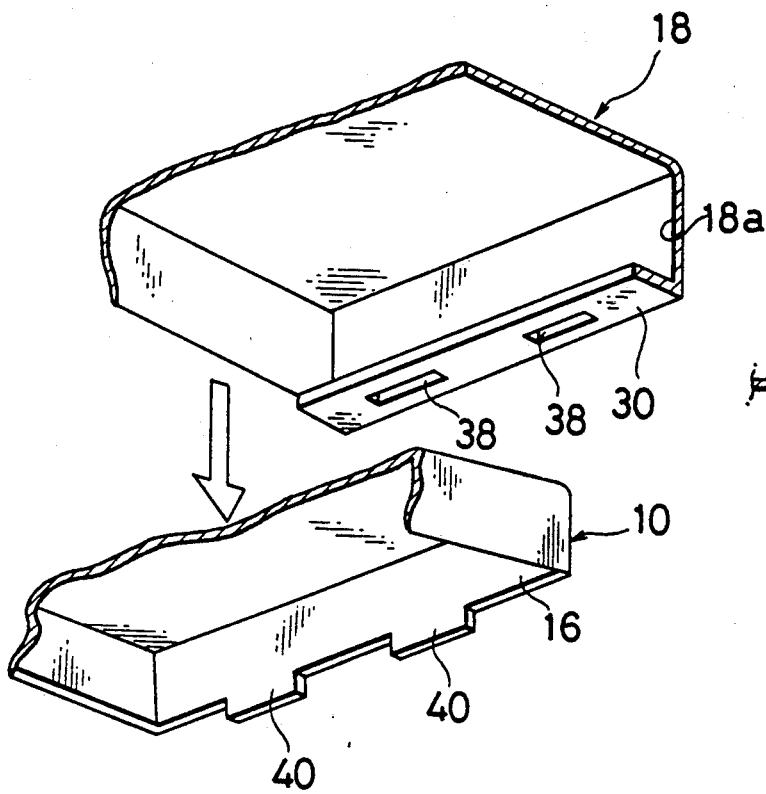
FIGS. 6A, 6B, 6C and 6D are views for illustrating an assembling process thereof.
Figure 6B:
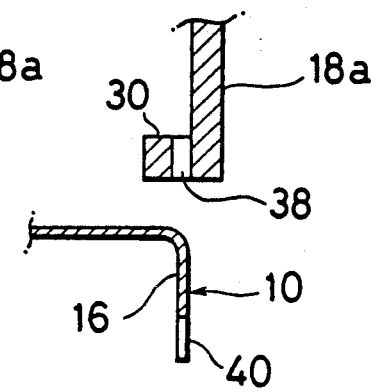
Figure 6C:
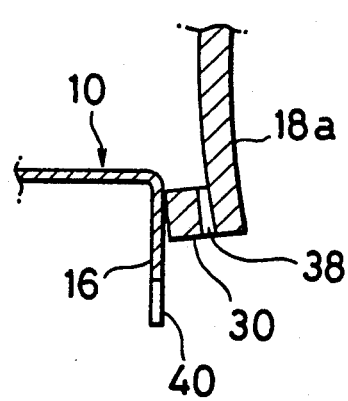
Figure 6D:
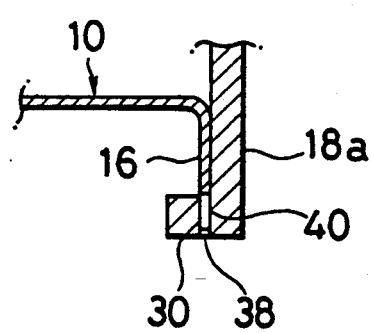
Figure 7:
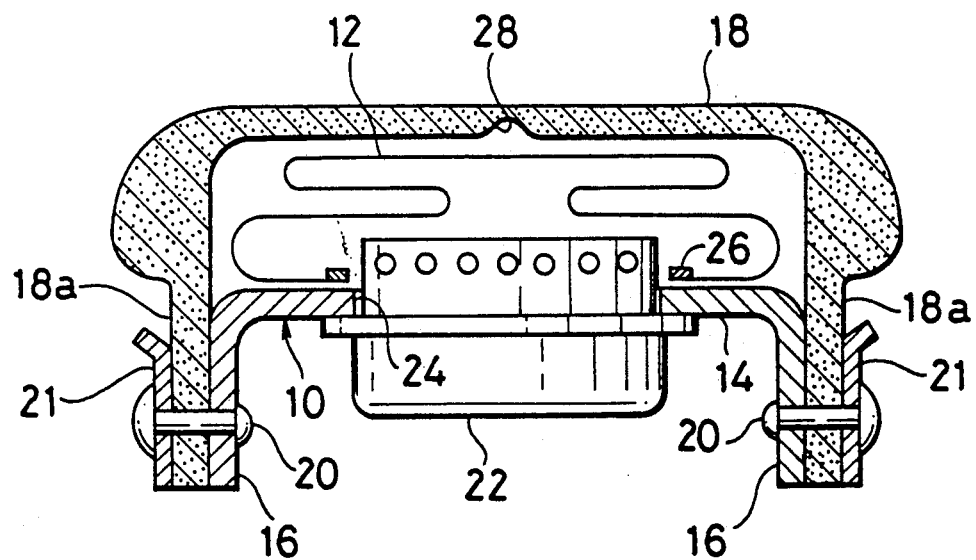
FIGS. 7 and 8 are cross sections illustrating a prior art.
Figure 8:
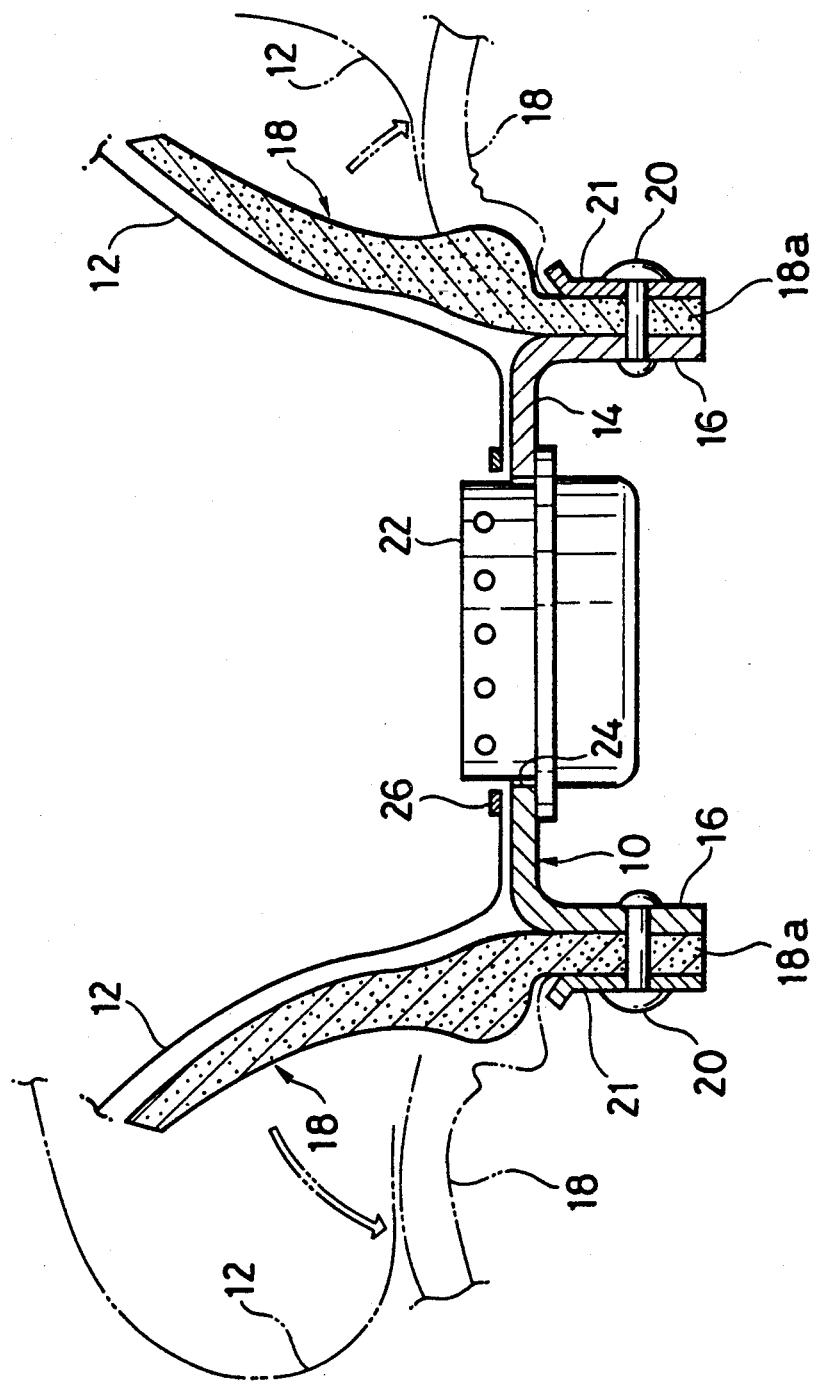

Also in this embodiment, when the module cover 18 is moved to cover the retainer 10, the leg 18a elastically deforms outward along the outer surface of the erected piece 16 of the retainer 10, as shown in FIG. 6C, and ultimately, the hook 30 engages with the end of the erected piece 16, as shown in FIG. 6D. In this operation, the projections 40 are located in the opening 38 to engage the module cover 18 extremely tightly with the retainer.

Also in this embodiment, even if the air bag 12 applies the resiliency to the module cover 18 prior to the riveting, the module cover 18 is not dislocated from the retainer 10. Particularly, in this embodiment, since the projections 40 and the openings 38 are engaged with each other, dislocation of the module cover 18 from the retainer 10 can be reliably prevented even if a relatively large resiliency is applied from the air bag 12 to the module cover 18 or an external force is applied thereto. Further, owing to the engagement of the projections 40 and the openings 38, constant positioning of the module cover 18 and the retainer 10 can be achieved, which extremely facilitates the riveting work to be performed after coinciding of the rivet holes of the retainer 10 and the module cover 18.

According to the air bag device of the invention, as described hereinabove, since the module cover is temporarily fixed to the retainer in the assembling process thereof, the assembling work of the air bag device can be extremely facilitated, and thus the assembling work efficiency can be remarkably improved. Further, the engagement of the engagement portion with the retainer increases coupling strength between the module cover and the retainer in the tearing operation of the module cover when the air bag device is activated.

What is claimed is:
1. An air bag device, comprising,
an air bag,
a retainer including a plate portion with an outer surface, said air bag being placed on the outer surface, and erected pieces extending from the plate portion in the direction away from the outer surface of the plate portion and having outer surfaces,
a module cover for covering the air bag placed on the retainer, said module cover having leg portions overlapping the erected pieces of the retainer,
a plurality of tongues formed on the erected pieces, each tongue having an upper end flush with the outer surface of the erected piece on which it is formed and a lower end located away from the outer surface of the erected piece on which it is formed so that each tongue extends downwardly outwardly from the erected piece on which it is formed at a predetermined angle, and
a plurality of openings formed in the leg portions of the module cover at positions corresponding to the tongues of the erected pieces so that when the leg portions of the module cover are slid over the erected pieces of the retainer for assembling together, the leg portions pass over the tongues and allow the openings to engage with the tongues to thereby firmly hold the module cover over the retainer.

2. An air bag device of claim 1, wherein each opening formed in the leg portion of the module cover is inclined at an angle corresponding to the angle of its engaging tongue so that its engaging tongue easily enters into the opening.

3. An air bag device of claim 2, further comprising fixing means for fixing the module cover to the retainer, said fixing means including reinforcing means to be placed over the leg portions and rivets extending through the reinforcing means, the leg portions and the erected pieces to fasten together.

4. An air bag device, comprising,
an air bag,
a retainer including a plate portion with an outer surface, said air bag being placed on the outer surface, and erected pieces extending from the plate portion in the direction away from the outer surface of the plate portion and having lower edges and a plurality of projections extending further downwardly from the lower edges of the erected pieces,
a module cover for covering the air bag placed on the retainer, said module cover having leg portions overlapping the erected pieces of the retainer, and hook portions formed at lower ends of the leg portions of the module cover, said hook portions extending in the directions toward the erected pieces of the retainer located adjacent thereto and having a plurality of openings adjacent to the leg portions, the openings having sizes corresponding to the sizes of the projections so that when the leg portions with the hook portions are slid over the erected pieces of the retainer for assembling together, the hook portions pass over the lower edges of the erected pieces to engage thereto and the projections of the erected pieces enter into the openings of the hook portions to thereby firmly hold the module cover over the retainer.

5. Air bag device of claim 4, further comprising fixing means for fixing the module cover to the retainer, said fixing means including reinforcing means to be placed over the leg portions and rivets extending through the reinforcing means, the leg portions and the erected pieces to fasten together.

* * * * *